(12) United States Patent
Nishimura et al.

(10) Patent No.: US 7,940,348 B2
(45) Date of Patent: May 10, 2011

(54) DISPLAY DEVICE WITH ELECTRICALLY CONDUCTIVE MEMBER

(75) Inventors: Hideki Nishimura, Kanagawa (JP); Hiroshi Suzuki, Kanagawa (JP)

(73) Assignee: Nec Corporation, Tokyo (JP)

( * ) Notice: Subject to any disclaimer, the term of this patent is extended or adjusted under 35 U.S.C. 154(b) by 1263 days.

(21) Appl. No.: 11/523,590

(22) Filed: Sep. 20, 2006

(65) Prior Publication Data

US 2007/0070263 A1     Mar. 29, 2007

(30) Foreign Application Priority Data

Sep. 27, 2005   (JP) .................................. 2005-279672

(51) Int. Cl.
*G02F 1/1333* (2006.01)
*G02F 1/1335* (2006.01)
(52) U.S. Cl. .............................. 349/59; 349/96; 349/162
(58) Field of Classification Search ................... 349/59, 349/162
See application file for complete search history.

(56) References Cited

U.S. PATENT DOCUMENTS

| 6,034,757 A * | 3/2000 | Yanagawa et al. ............ 349/141 |
| 6,597,414 B1 | 7/2003 | Hasegawa |
| 2003/0122997 A1* | 7/2003 | Noh et al. ....................... 349/96 |
| 2005/0110916 A1* | 5/2005 | Park et al. ....................... 349/58 |
| 2005/0151271 A1* | 7/2005 | Tatsuzawa et al. ............. 257/783 |
| 2005/0197450 A1* | 9/2005 | Amano et al. .................. 525/30 |

FOREIGN PATENT DOCUMENTS

| JP | 2000-85068 | 3/2000 |
| JP | 2000-250062 | 9/2000 |

OTHER PUBLICATIONS

Chinese Office Action dated Nov. 30, 2007 with an English Translation.

\* cited by examiner

*Primary Examiner* — Mark A Robinson
*Assistant Examiner* — Michael Inadomi
(74) *Attorney, Agent, or Firm* — McGinn IP Law Group, PLLC

(57) ABSTRACT

An electrically conductive film is placed between a contact finger and an electrically conductive polarizing plate which hold a display panel therebetween, and static electricity accumulated in the display panel is released to a front frame through the electrically conductive film and the finger. This structure makes it possible to prevent deterioration in the display quality of a display device due to static electricity.

11 Claims, 9 Drawing Sheets

DISPLAY DEVICE WITH ELECTRICALLY CONDUCTIVE MEMBER

BACKGROUND OF THE INVENTION

1. Field of the Invention

The present invention relates to a display device, particularly to a flat display device having an optical filter such as a polarizing plate.

2. Description of the Prior Art

In a conventional flat display device such as a liquid crystal display (LCD) device as described in Japanese Unexamined Patent Publication No. 2000-250062, a transparent electrode layer is provided on a polarizing plate formed on a color filter substrate of an LCD panel. The transparent electrode layer prevents the accumulation of static electricity in the LCD panel to avoid such trouble as flicker in a display screen. The static electricity is released to ground through a contact pin or contact finger or the like connected to the transparent electrode layer. In view of cost reduction, the transparent electrode layer may be removed, and the polarizing plate can be replaced by an electrically conductive polarizing plate.

An example of such conductive polarizing plate is disclosed in Japanese Unexamined Patent Publication No. 2000-085068. According to this document, in the conductive polarizing plate, a coat layer made of a transparent electrically conductive polymer, which contains at least acrylic ester having a quaternary ammonium salt group as a monomer component, is provided on the surface of a protective layer of a polarizer. Furthermore, a transparent protective film is provided on the surface of this coat layer. Thus, the conductive polarizing plate is configured.

FIG. 1 is a cross-sectional view showing an example of an LCD device in which an electrically conductive polarizing plate as described above is used. An LCD panel 100 includes two glass substrates, which are a thin-film transistor (TFT) substrate 101 and a color filter substrate 102, and a liquid crystal layer (not shown) interposed between these substrates. On surfaces of the two glass substrates, a TFT-side polarizing plate 104 and an electrically conductive polarizing plate 103 are respectively provided. Both sides of the LCD panel 100 are held between a front frame 107 and a chassis 105. The front frame 107 and the chassis 105 are made of an electrically conductive material. The conductive polarizing plate 103 and the front frame 107 are brought into electrical contact with each other through a contact finger 106.

An electrically conductive transparent electrode layer provided on the surface of the glass substrate at the side of the color filter has a surface resistance of 200Ω to 300Ω. Meanwhile, the conductive polarizing plate has a very large surface resistance of 30 MΩ to 500 MΩ. Accordingly, in a case where the conductive polarizing plate 103 as shown in FIG. 1 is used in an LCD device, electrical continuity between the conductive polarizing plate and the front frame 107 is ensured by pushing the conductive polarizing plate 103 with a force of not less than 0.5 N using the finger 106.

However, when a large force is applied to the LCD panel 100 with the finger 106, a local distortion occurs in the LCD panel 100, and causes display unevenness on the display screen. In particular, when a totally black display is produced, a portion, in which a distortion occurs, looks whitish. This display unevenness is serious matter for a display device.

SUMMARY OF THE INVENTION

The present invention provides a display device in which the occurrence of display unevenness for a case using an electrically conductive polarizing plate is used can be suppressed.

A display device of the present invention includes a display panel, and first and second holding members for holding the display panel therebetween. The second holding member has an electrical conductivity. The display panel includes an electrically conductive polarizing plate at least on a surface thereof at a side of the second holding member, and an electrically conductive film between the conductive polarizing plate and the second holding member. The electrically conductive film is in contact with the conductive polarizing plate.

In the display device of the present invention, the electrically conductive film includes two layers, which are a first electrically conductive layer made of any one of metal foil and carbon foil and a second electrically conductive layer made of an electrically conductive adhesive. In the display device of the present invention, the polarizing plate includes a polarizer layer, an electrically conductive polymer layer provided on the polarizer layer, and a transparent organic protective film provided on the conductive polymer layer.

In the display device of the present invention, the second holding member may include an electrically conductive protruding portion in contact with the conductor film at the side of the polarizing plate.

In the display device of the present invention, the second electrically conductive layer of the electrically conductive film contacts with the transparent organic protective film of the polarizing plate. This second electrically conductive layer of the electrically conductive film may be configured so as to be in direct contact with the conductive polymer layer under the transparent organic protective film of the polarizing plate.

The display device of the present invention has the following advantageous effects.

A first advantage is that the conductor film having an electrically conductive adhesive causes contact resistance to the conductive polarizing plate to be small and stable. The reason is that an electrically conductive adhesive layer of the electrically conductive film enables the conductor film to adhere closely to the surface of the conductive polarizing plate, and that this intimate adhesion can cause contact resistance to be lowered.

A second advantage is that in a case where the conductive protruding portion is provided on a holding surface of the second holding member, the conductive protruding portion is not in direct contact with the conductive polarizing plate, but is made electrically continuous to the conductive polarizing plate through the electrically conductive film. Electrical continuity between the conductive protruding portion and the conductive polarizing plate can be established through the electrically conductive film with small stress. The reason is as follows. The surface of the electrically conductive film is made of metal foil or carbon foil, and contact between the electrical conductive protruding portion and the conductor film is equivalent to metal-to-metal contact. Accordingly, contact resistance between the conductive protruding portion and the conductive polarizing plate can be made small even in a case of contact with small stress. As a result, in a case where the conductive protruding portion is provided on the holding surface of the second holding member, the conductive protruding portion does not apply a load to the display panel, such as an LCD panel, with such stress that a distortion or the like occurs. As a result, the occurrence of display unevenness on a display screen can be suppressed, and image quality can be improved.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Figure 1:
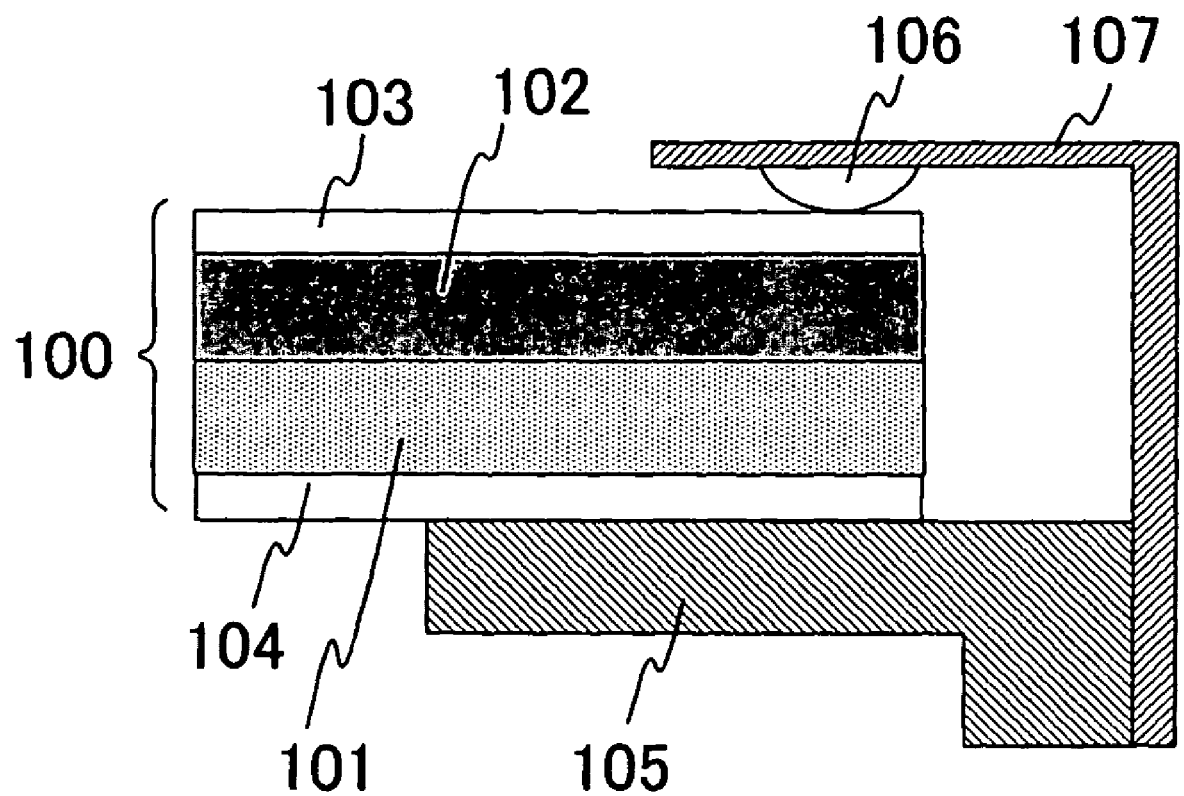
FIG. 1 is a cross-sectional view showing an example of a conventional LCD device in which an electrically conductive polarizing plate is used.
Figure 2:
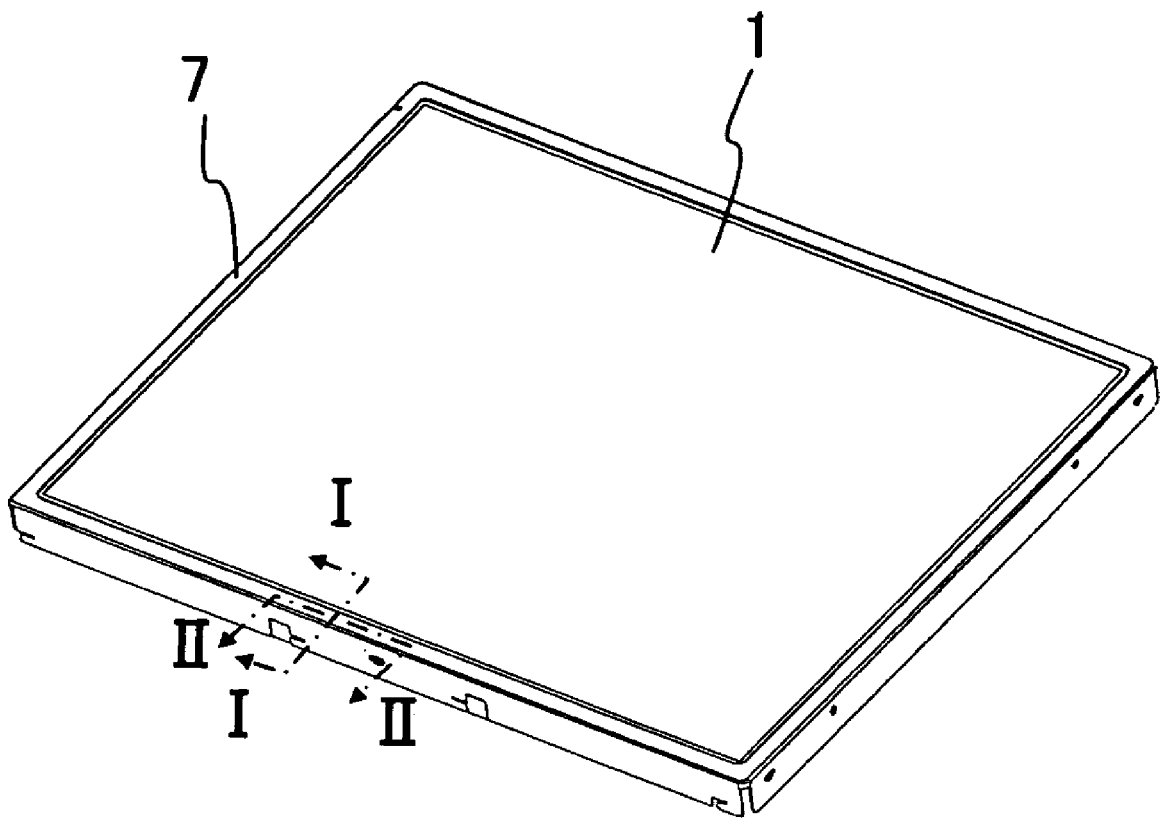
FIG. 2 is a perspective view showing an appearance of an LCD device of an embodiment of the present invention.
Figure 3:
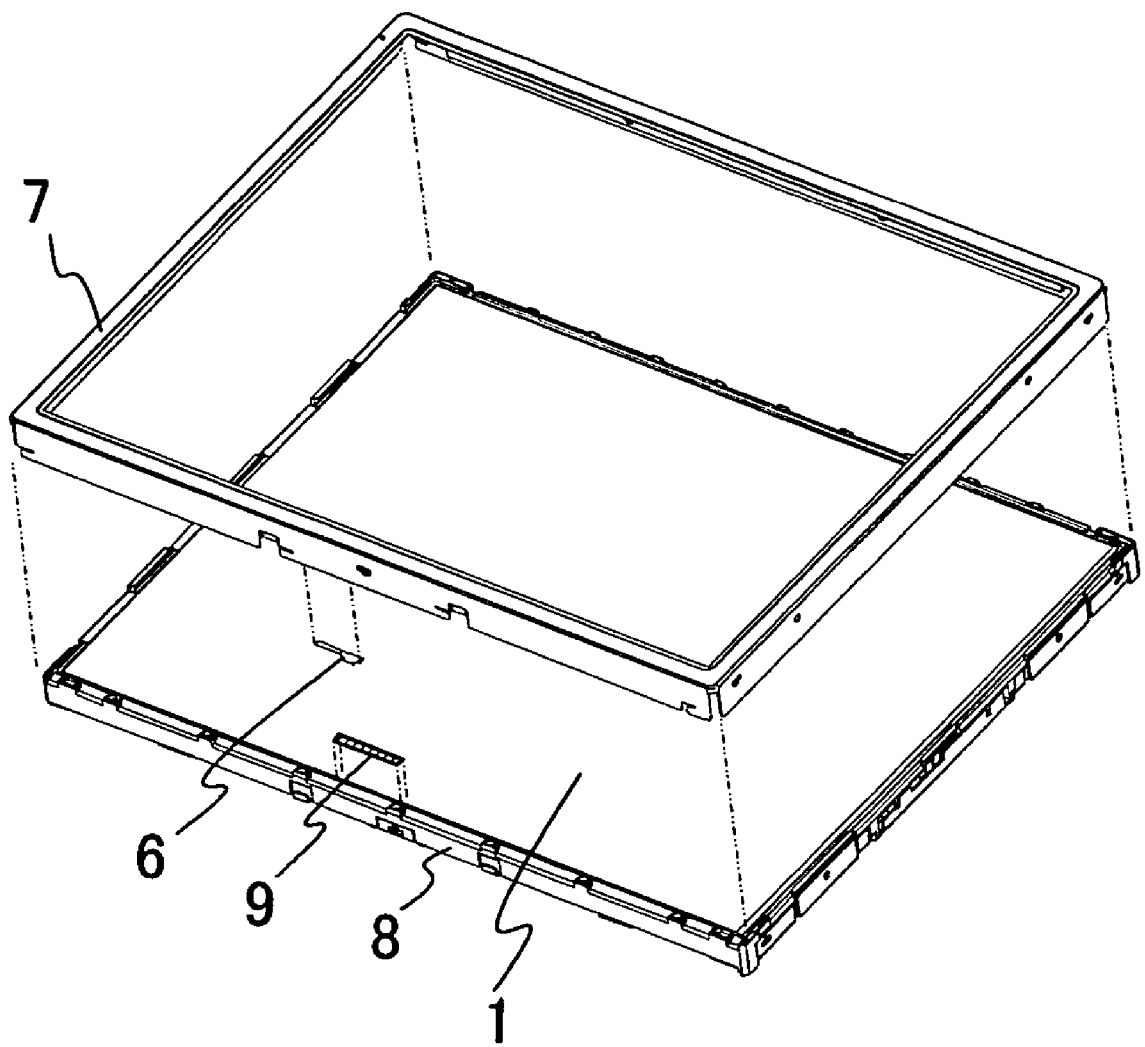
FIG. 3 is an exploded perspective view of the LCD device of FIG. 2 where a front frame thereof is removed.

FIG. 2 is a perspective view showing an appearance of an LCD device of the present invention. In the drawing, reference numeral 1 denotes an LCD panel, and reference numeral 7 denotes a front frame. FIG. 3 shows an exploded perspective view of the LCD device of FIG. 2 where the front frame of the LCD is removed. Reference numerals 6, 8, and 9 of FIG. 3 denote a contact finger, a chassis, and a conductor film, respectively. The chassis 8 and the front frame 7 of FIG. 3 hold the LCD panel 1 therebetween. The chassis 8 and the front frame 7 are made of metal. The electrically conductive film 9 is bonded to a surface of the LCD panel 1, and is in contact with the contact finger 6. The finger 6 is fixed to a surface of the LCD panel 1. Static electricity generated on the surface of the LCD panel 1 is released from the conductor film 9 through the finger 6 to the front frame 7.

Figure 4:
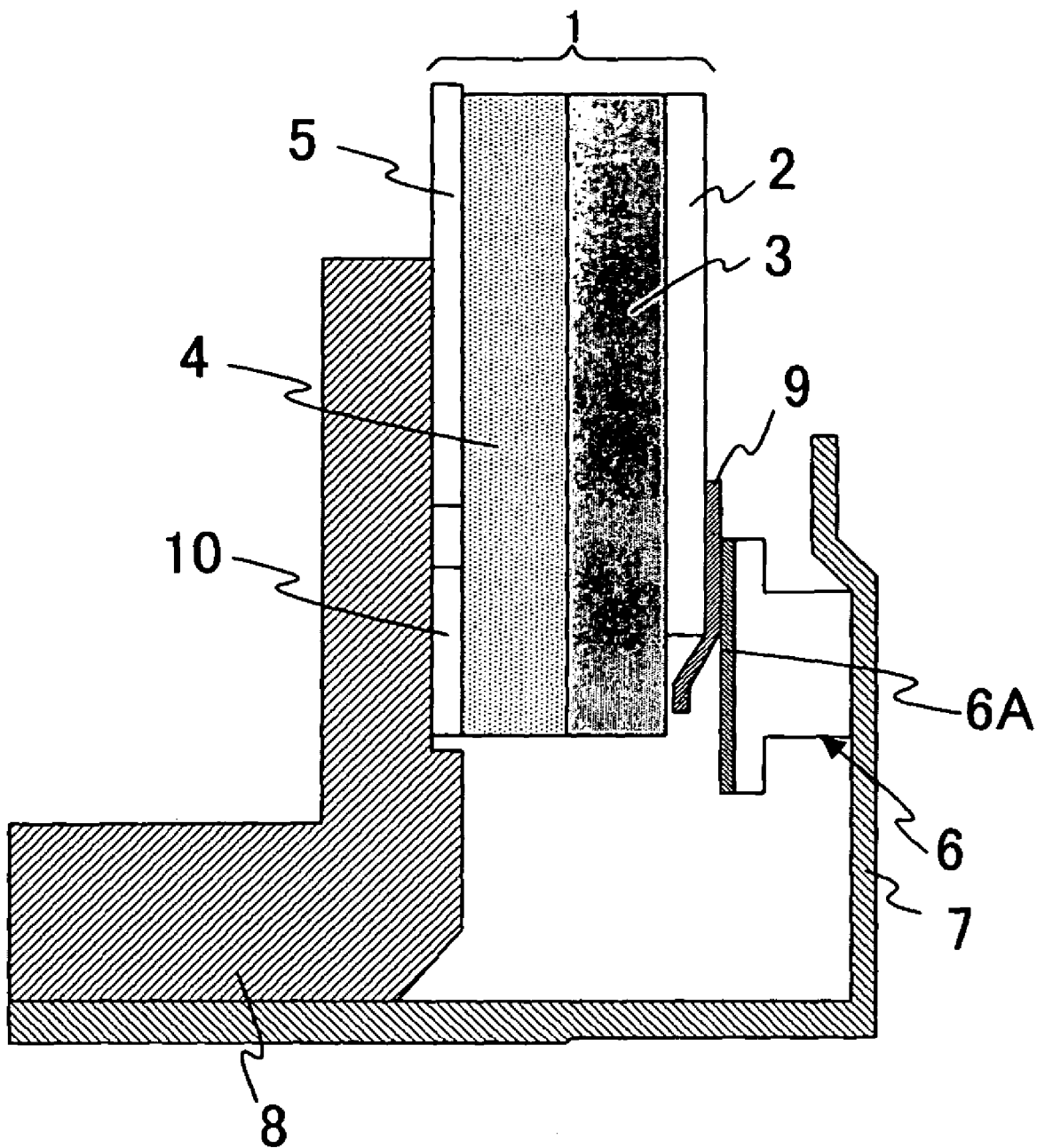
FIG. 4 is a cross-sectional view, which shows an LCD device of a first embodiment of the present invention, and which is taken along the line I-I of FIG. 2.
Figure 5:
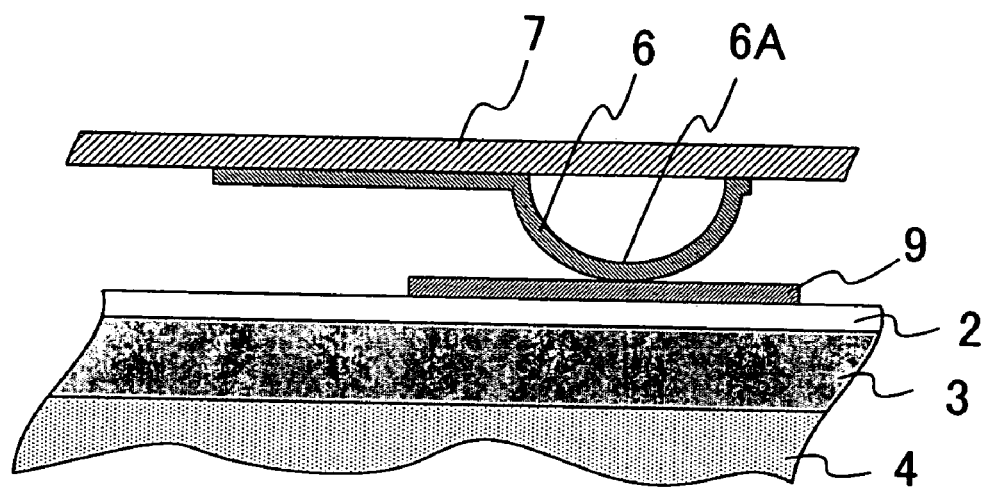
FIG. 5 is a cross-sectional view, which shows the LCD device of the first embodiment of the present invention, and which is taken along the line II-II of FIG. 2.

FIGS. 4 and 5 are cross-sectional views which show an LCD device of a first embodiment of the present invention, and are cross-sectional views taken along the lines I-I and II-II of FIG. 2, respectively.

Referring to FIG. 4, in the LCD device of the first embodiment of the present invention, an electrically conductive polarizing plate 2 is placed on a color filter glass substrate 3 of the LCD panel 1. Furthermore, a TFT-side polarizing plate 5 is placed on a TFT glass substrate 4 of the LCD panel 1. The TFT-side polarizing plate 5 may have conductivity. A liquid crystal layer is interposed between the color filter glass substrate 3 and the TFT substrate 4 of the LCD panel 1, but is not shown. The conductor film 9 is bonded to, and placed on, a surface of an end portion of the conductive polarizing plate 2. Moreover, the front frame 7 having the finger 6 provided on a surface thereof and the chassis 8 hold the LCD panel 1 therebetween from both sides. Thus, the LCD device is configured. Reference numeral 10 denotes a rubber spacer.

As apparent from the cross-sectional view of FIG. 5, the finger 6 has a shape in which an end portion of a long flat plate is curved to be convex downward with a predetermined curvature. A vertex portion 6A of the convex portion of the finger 6 is placed so as to be in contact with the conductor film 9.

Figure 6:
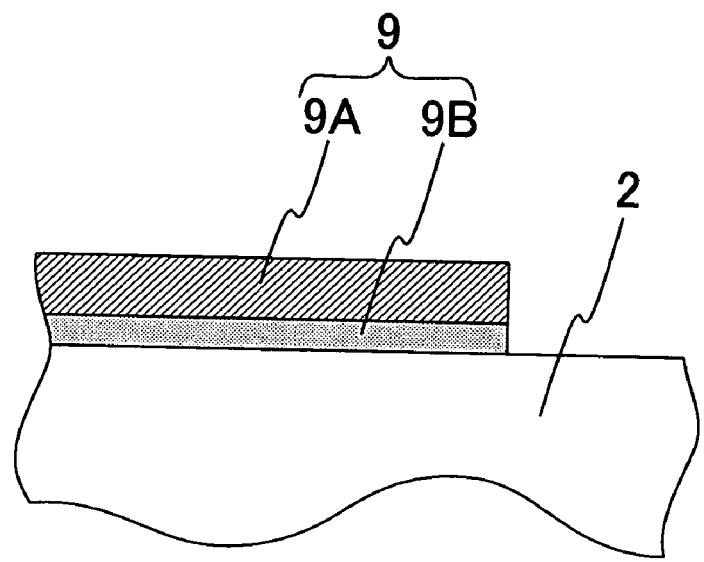
FIG. 6 is a cross-sectional view of a conductor film placed on an electrically conductive polarizing plate.

FIG. 6 is a cross-sectional view of the conductor film 9 placed on the conductive polarizing plate 2. The conductor film 9 includes two layers, which are an electrically conductive adhesive layer 9B and a metal foil 9A. As a material for the metal foil 9A, aluminum, tin, nickel, copper, or the like can be used. The thickness of the metal foil 9A is, for example, approximately 5 to 100 μm, preferably approximately 10 to 80 μm. It should be noted that a carbon layer can be provided instead of the metal foil 9A.

As a material for the conductive adhesive layer 9B, what is made by adding conductive powder to an adhesive material prepared by dissolving rubber or acrylic resin in an organic solvent can be used. As the conductive powder, for example, the following can be used: a metal such as nickel, iron, chromium, cobalt, aluminum, antimony, molybdenum, copper, silver, platinum, or gold; an alloy or an oxide thereof; carbon such as carbon black; or the like. These conductive powders can be used solely or in combination of two or more kinds thereof. The thickness of the conductive adhesive layer 9B is, for example, 10 to 500 μm, preferably approximately 30 to 100 μm.

Figure 7A:
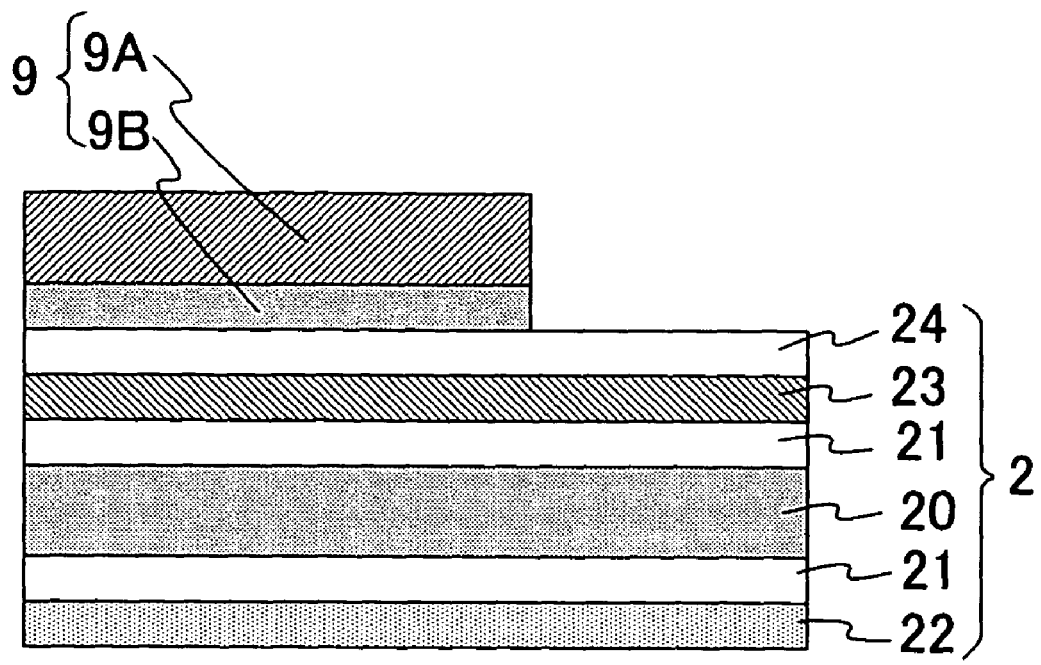
FIGS. 7A and 7B are cross-sectional views respectively showing states in which the conductor film bonded to the surface of the conductive polarizing plate is placed.
Figure 7B:
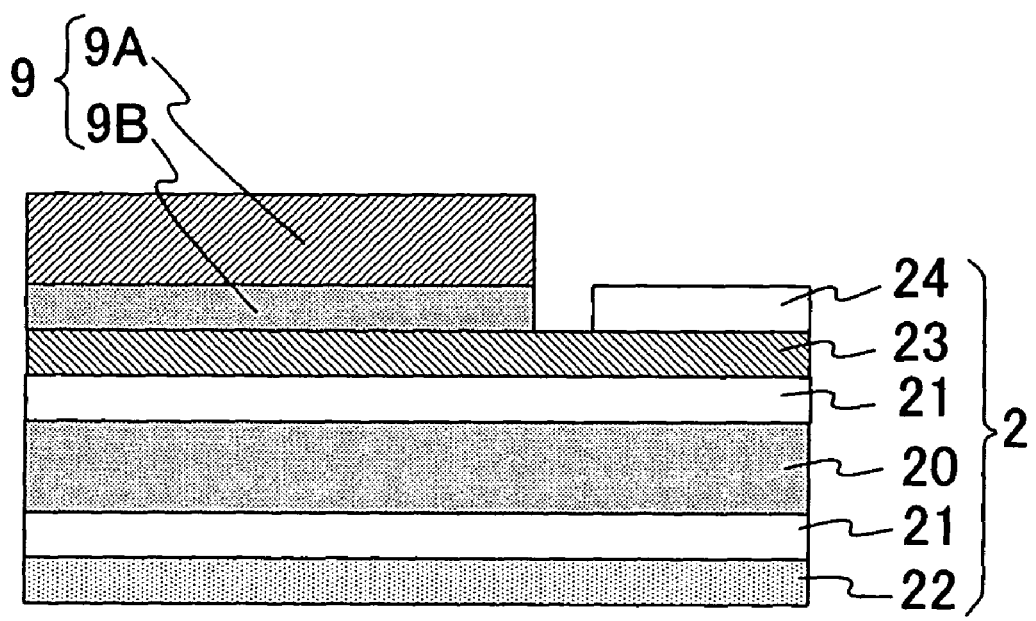

FIGS. 7A and 7B are cross-sectional views showing states in which the conductor film 9 bonded to a surface of the conductive polarizing plate 2 is placed. Referring to FIGS. 7A and 7B, the conductive polarizing plate 2 includes an acrylic resin adhesive layer 22, a polarizer layer 20, which is formed on the adhesive layer 22, and which has protective layers 21 made of cellulose triacetate or the like, and an electrically conductive polymer layer 23 formed on the protective layer 21 of the polarizer layer 20. On the conductive polymer layer 23, an antiglare film 24, which is made of acrylic resin or the like, is formed. The conductive polymer layer 23 contains, for example, an organic monomer having a quaternary ammonium salt group, and an electrically conductive polymer such as polythiophene, polyaniline, or polypyrrole. The thickness of the conductive polymer layer 23 is approximately 50 μm to 150 μm, and the thickness of the antiglare film 24 is 3 μm to 6 μm.

Generally, as shown in FIG. 7A, the conductor film 9 is adhered to the antiglare film 24 of the conductive polarizing plate 2 with the conductive adhesive layer 9B. As shown in FIG. 7B, it is also possible to form the antiglare film 24 of the conductive polarizing plate 2 so as to be partially exposed the surface of the conductive polymer 23, and to adhere the conductor film 9 to the exposed surface of the conductive polymer 23. In the structure of FIG. 7B, static electricity can be more easily released from the LCD panel 1.

The LCD device of the first embodiment of the present invention has the conductor film 9 between the conductive polarizing plate 2 and the finger 6. Since the conductor film 9 is adhered to the conductive polarizing plate 2 with the conductive adhesive layer 9B, the finger 6 is in contact with the conductive polarizing plate 2 even with a force of approximately 0.1 N. Thereby, stable electrical continuity can be ensured. This is because metal-to-metal contact between the metal foil 9A at the surface of the conductor film 9 and the finger 6 enables stable electrical continuity to be ensured with small stress. Hence, it is also made possible to suppress the occurrence of display unevenness on a display screen of the LCD device.

Next, descriptions will be provided for operations of the LCD device of the first embodiment of the present invention.

The electrically conductive film 9 is adhered to the conductive polarizing plate 2 of the LCD panel 1, and the conductive adhesive layer 9B of the electrically conductive film 9 adheres to the antiglare film 24 of the conductive polarizing plate 2. The antiglare film 24 has a very small thickness of approximately several micrometers, and static electricity itself has a high voltage of 5 to 15 kV. Accordingly, electrical continuity can be established between the conductive polarizing plate 2 and the electrically conductive film 9. As a result, static electricity can be released to the front frame 7 from the conductive polarizing plate 2 through the electrically conductive film 9 and the finger 6. As shown in FIG. 7B, a portion of the conductive polymer layer 23 of the conductive polarizing plate 2 can be exposed to bond the conductive adhesive layer 9B of the electrically conductive film 9 to the exposed surface. This structure enables static electricity to be released to the front frame 7 more easily.

Generally, when the LCD device is incorporated into a monitor or a display device of a computer, the LCD device is screwed and fixed onto a casing of a device into which the LCD device is incorporated. Portions of the LCD device, which is screwed onto the casing, are in contact with the front frame 7. Static electricity released to the front frame 7 can be released from the front frame 7 to the casing of the device into which the LCD device is incorporated, and to ground. In a case where static electricity or the like is applied to the LCD panel 1, the static electricity is released to the ground without affecting a display.

Moreover, since the finger 6 and the conductive polarizing plate 2 are in a low-resistance contact, it is made possible to cause the finger 6 to be in contact with the conductive polarizing plate 2 with a small force. Thus, the stress of the finger 6 is prevented from pushing the LCD panel 1 with such a force that a distortion occurs in the LCD panel 1.

Figure 8:
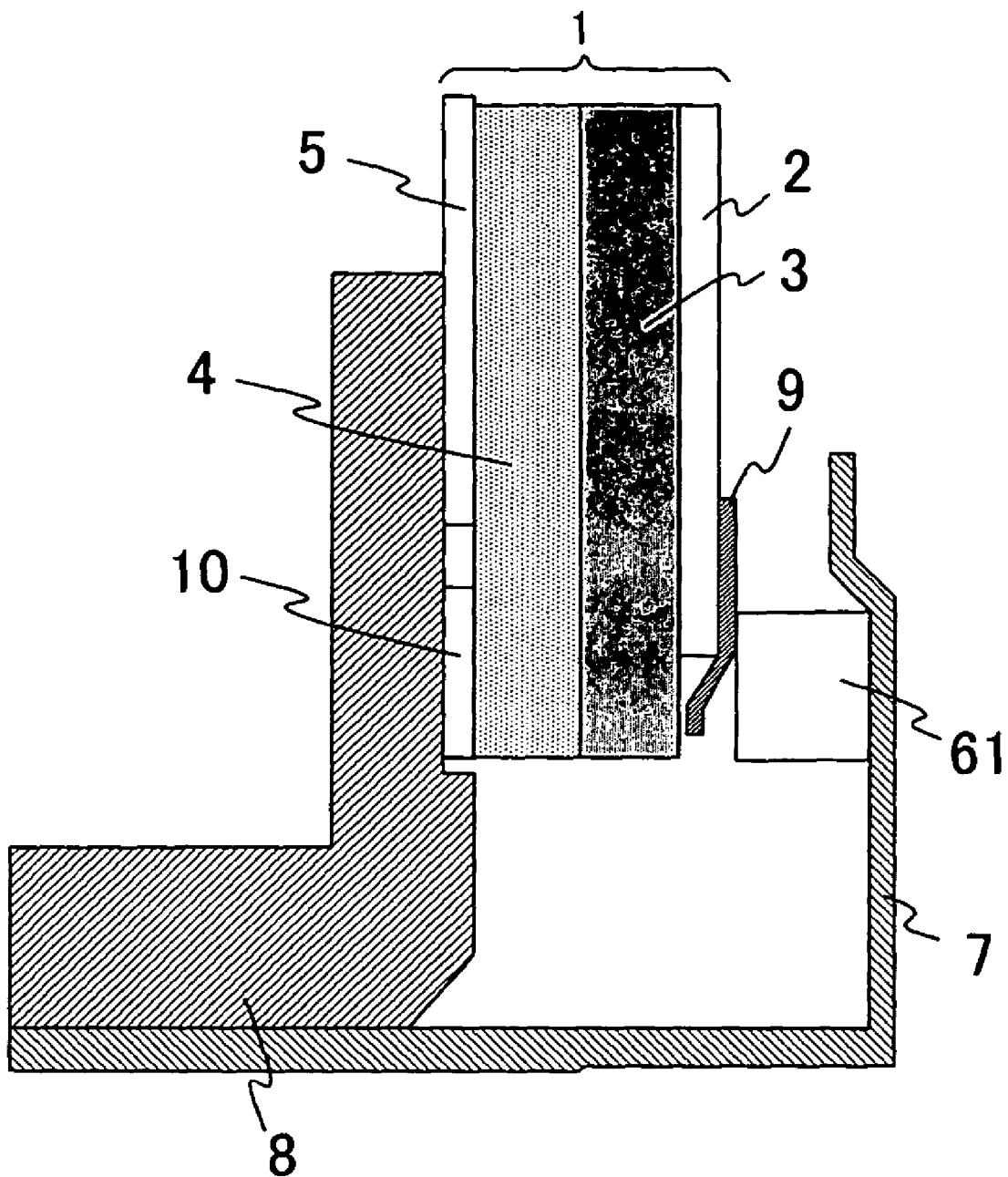
FIG. 8 is a cross-sectional view, which shows an LCD device of a second embodiment of the present invention, and which is taken along the line I-I of FIG. 2.

Subsequently, descriptions will be provided for an LCD device of a second embodiment of the present invention. In the above-described LCD device of the first embodiment of the present invention, electrical continuity is established with the finger 6. However, it is also possible to configure the liquid display device of an electrically conductive component or the like other than the finger 6. In this embodiment, as shown in FIG. 8, a component 61 having electrical conductivity is used instead of the finger 6 of the above-described LCD device of the first embodiment of the present invention. As the component 61, for example, a cushioning gasket can be used. As the gasket, a urethane foam sponge, around which an electrically conductive substance in cloth form is wound, can be used. The thickness of the gasket is approximately 1 mm to 2 mm, and the width thereof is approximately 1 mm to 5 mm. Note that the same reference numerals as those of FIG. 4 denote the same components in FIG. 8. Incidentally, FIG. 8 is a cross-sectional view taken along the line I-I of FIG. 2.

Figure 9:
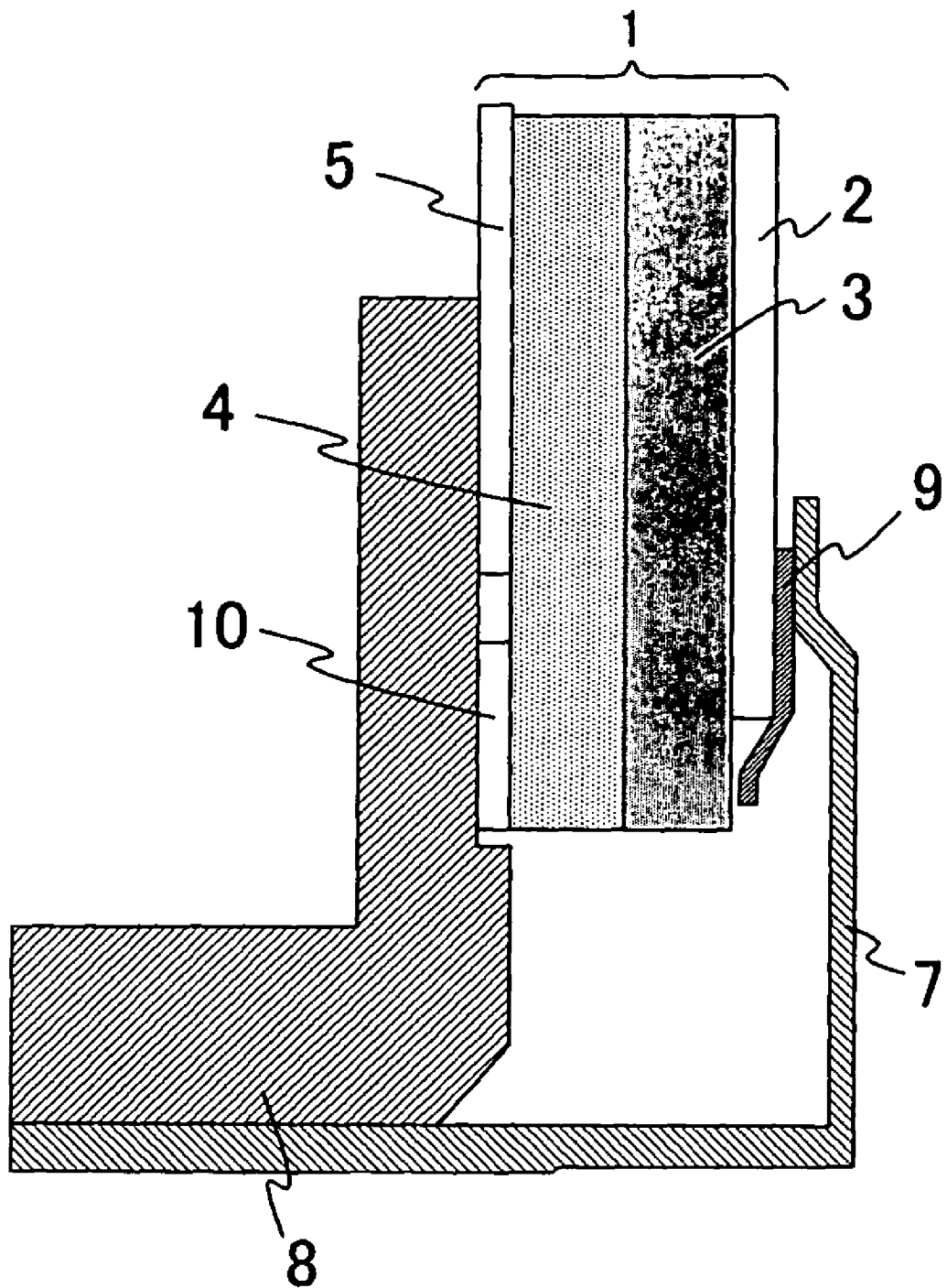
FIG. 9 is a cross-sectional view, which shows an LCD device of a third embodiment of the present invention, and which is taken along the line I-I of FIG. 2.
Figure 10:
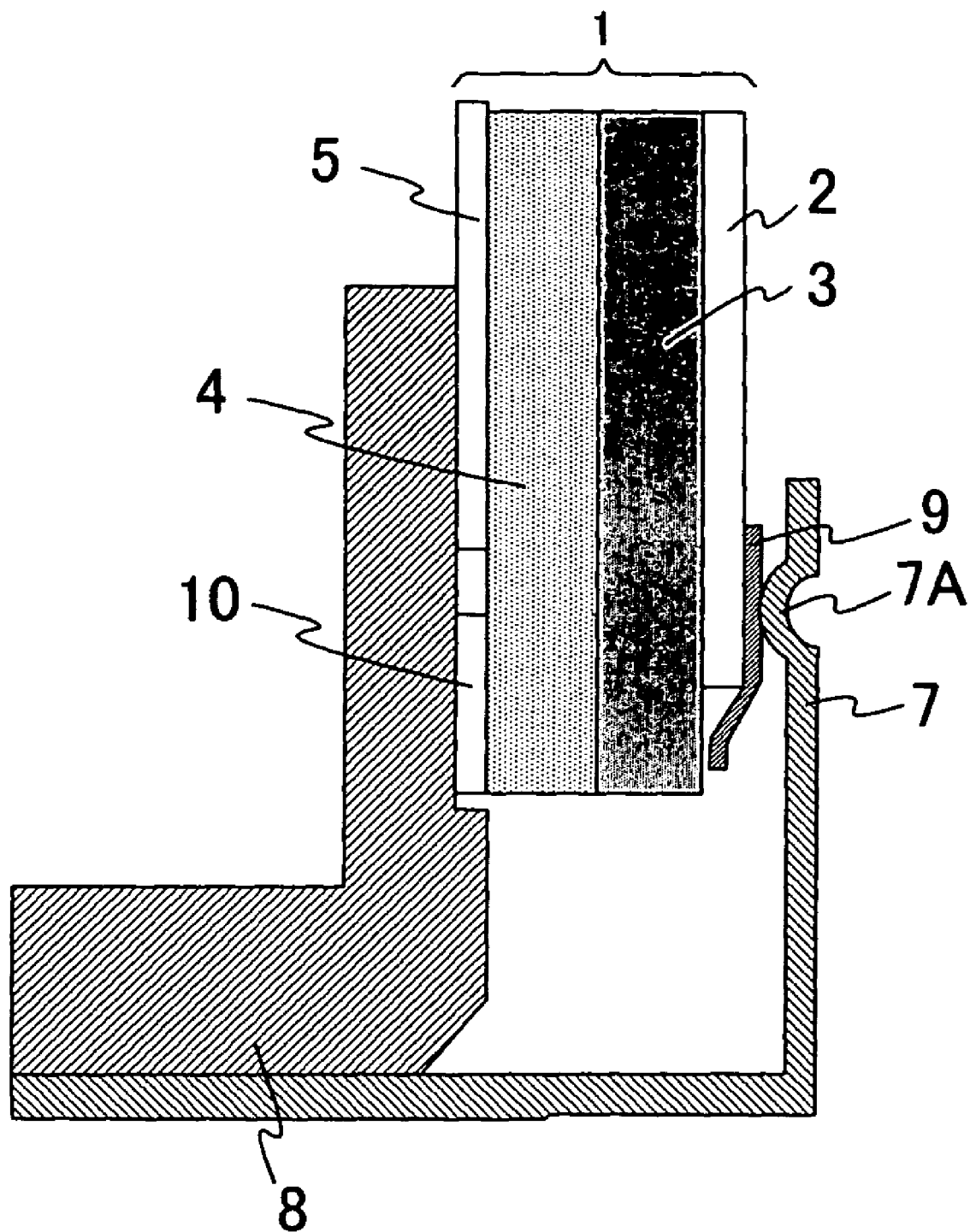
FIG. 10 is a cross-sectional view, which shows an LCD device of the third embodiment of the present invention, and which is taken along the line I-I of FIG. 2.

Next, descriptions will be provided for an LCD device of a third embodiment of the present invention. In the aforementioned LCD device of the first embodiment of the present invention, electrical continuity is established with the finger 6. The LCD device of this embodiment has a configuration in which the front frame 7 is in direct contact with the conductor film 9 without using the finger 6 as shown in FIG. 9. Furthermore, as shown in FIG. 10, it is also possible to form a protruding portion 7A by machining, in a portion which is in contact with the conductor film 9 of the front frame 7. The use of the front frame of FIG. 10 makes it possible to obtain an effect (electrical continuity) similar to that of the finger 6 of FIG. 4, and to reduce the number of components of the LCD device and the number of assembly steps. Note that the same reference numerals as those of FIG. 4 denote the same components in FIG. 9 and FIG. 10.

In the above-described embodiments of the present invention, LCD devices have been described as display devices. However, it is a matter of course that the above-described static electricity prevention configuration can be applied to display devices such as an organic EL display device and a plasma display device, as other examples.

While this invention has been described in connection with certain preferred embodiments, it is to be understood that the subject matter encompassed by way of this invention is not to be limited to those specific embodiments. On the contrary, it is intended for the subject matter of the invention to include all alternative, modification, and equivalents as can be included within the spirit and scope of the following claims.

What is claimed is:

1. A display device, comprising:
a display panel;
first and second holding members for holding the display panel therebetween, the second holding member having electrical conductivity;
an electrically conductive polarizing plate placed between the display panel and the second holding member;
an electrically conductive member placed between the electrically conductive polarizing plate and the second holding member so as to be in contact with the second holding member; and
an electrically conductive film placed between the electrically conductive polarizing plate and the electrically conductive member so as to be in contact with both of the electrically conductive polarizing plate and the electrically conductive member,
wherein the electrically conductive member comprises a finger having a shape in which an end portion of a long flat plate is curved to be convex downward with a predetermined curvature.

2. The display device according to claim 1, wherein the electrically conductive film comprises two layers, which comprise a first electrically conductive layer comprising one of a metal foil and a carbon foil, and a second electrically conductive layer comprising an electrically conductive adhesive.

3. The display device according to claim 2, wherein the electrically conductive adhesive is configured by adding an electrically conductive powder to an adhesive material prepared by dissolving one of a rubber and an acrylic resin in an organic solvent.

4. The display device according to claim 3, wherein the electrically conductive powder comprises at least one selected from a group consisting of nickel, iron, chromium, cobalt, aluminum, antimony, molybdenum, copper, silver, platinum, gold, and carbon.

5. The display device according to claim 2, wherein the second electrically conductive layer of the electrically conductive film is in contact with the electrically conductive polymer layer.

6. The display device according to claim 1, wherein the polarizing plate comprises a polarizer layer, an electrically conductive polymer layer provided on the polarizer layer, and a transparent organic protective film provided on the electrically conductive polymer layer.

7. The display device according to claim 6, wherein the electrically conductive film is in contact with the transparent organic protective film of the polarizing plate.

8. The display device according to claim 6, wherein the electrically conductive polymer layer comprises an organic monomer having a quaternary ammonium salt group, and one electrically conductive polymer selected from a group consisting of polythiophene, polyaniline, and polypyrrole.

9. The display device according to claim 1, wherein the second holding member comprises an electrically conductive protruding portion in contact with the electrically conductive film at a side of the polarizing plate.

10. The display device according to claim 9, wherein the electrically conductive protruding portion is formed integrally with the second holding member.

11. The display device according to claim 1, wherein the display panel comprises a liquid crystal display panel.

* * * * *